US012807321B2

(12) United States Patent
Bisson et al.

(10) Patent No.: US 12,807,321 B2
(45) Date of Patent: Nov. 24, 2026

(54) GAS TURBINE ENGINE EXHAUST NOZZLE

(71) Applicant: Pratt & Whitney Canada Corp., Longueuil (CA)

(72) Inventors: Jocelyn Bisson, Saint-Basile-le-Grand (CA); Mark Cunningham, Montreal-Ouest (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/747,043

(22) Filed: Jun. 18, 2024

(65) Prior Publication Data

US 2025/0382066 A1 Dec. 18, 2025

(51) Int. Cl.

| | |
|---|---|
| ***B64D 33/04*** | (2006.01) |
| ***F02K 1/38*** | (2006.01) |
| ***F02K 1/48*** | (2006.01) |

(52) U.S. Cl.

CPC .............. *B64D 33/04* (2013.01); *F02K 1/386* (2013.01); *F02K 1/48* (2013.01); *F05D 2220/323* (2013.01)

(58) Field of Classification Search

CPC ... F02K 1/46; F02K 1/48; F02K 1/386; B64D 33/04; B64D 33/06; F05D 2260/608

See application file for complete search history.

(56) References Cited

U.S. PATENT DOCUMENTS

| | | | | |
|---|---|---|---|---|
| 4,045,957 | A * | 9/1977 | DiSabato | F02K 1/386 60/262 |
| 4,302,934 | A | 12/1981 | Wynosky | |
| 4,548,034 | A * | 10/1985 | Maguire | F02K 1/386 60/264 |
| 6,606,854 | B1 | 8/2003 | Siefker | |
| 7,389,635 | B2 | 6/2008 | Anderson | |
| 7,784,270 | B2 | 8/2010 | Dussillols | |
| 7,810,335 | B2 | 10/2010 | Dussillols | |
| 8,104,260 | B2 | 1/2012 | Girgis | |
| 10,730,636 | B2 | 8/2020 | Lerg | |

(Continued)

FOREIGN PATENT DOCUMENTS

| | | | |
|---|---|---|---|
| CN | 106246408 | B | 10/2017 |
| EP | 2497934 | B1 | 4/2014 |

OTHER PUBLICATIONS

EP Search Report for EP Patent Application No. 25183338.0 dated Nov. 13, 2025.

*Primary Examiner* — Andrew H Nguyen

(74) *Attorney, Agent, or Firm* — Getz Balich LLC

(57) ABSTRACT

A non-bypass gas turbine engine is provided that includes compressor, combustor, and turbine sections, an engine compartment enclosure, an exhaust nozzle, and a secondary exhaust nozzle. The engine compartment enclosure is disposed radially outside of the compressor, combustor, and turbine sections and defines a first annular region outside of the compressor, combustor, and turbine sections. The exhaust nozzle is disposed downstream of the turbine section and is configured to receive the core gas flow exiting the turbine section. The exhaust nozzle includes a wall panel with a plurality of lobes that extend between forward and aft ends of the exhaust nozzle. Each lobe has a lobe height that increases in a direction from the forward end to the aft end of the exhaust nozzle. The lobes de-swirl the core gas flow exiting the turbine section and draw air from the first annular region during operation of the engine.

20 Claims, 5 Drawing Sheets

(56) References Cited

U.S. PATENT DOCUMENTS

| | | | | |
|---|---|---|---|---|
| 11,085,333 | B2 | 8/2021 | Cunningham | |
| 2004/0068981 | A1 | 4/2004 | Siefker | |
| 2006/0207239 | A1 * | 9/2006 | Anderson | F02K 1/386 60/262 |
| 2009/0000304 | A1 * | 1/2009 | Anderson | F02K 1/386 415/173.1 |
| 2012/0279225 | A1 * | 11/2012 | Colas | F02K 1/46 239/265.17 |
| 2013/0087632 | A1 | 4/2013 | Germain | |
| 2014/0075954 | A1 * | 3/2014 | Tralshawala | G01M 15/10 60/779 |
| 2021/0362843 | A1 * | 11/2021 | Lamb, Jr. | B64D 33/04 |
| 2022/0325678 | A1 * | 10/2022 | Mengle | B64C 30/00 |

* cited by examiner

GAS TURBINE ENGINE EXHAUST NOZZLE

BACKGROUND OF THE INVENTION

1. Technical Field

The present disclosure relates gas turbine engines in general and to gas turbine engine exhaust nozzles in particular.

2. Background Information

The flow of fluid (e.g., core gas comprising non-combusted air and combustion products) exiting the last turbine stage typically has significant "swirl". The term "swirl" refers to the angular orientation of the fluid flow. As the term is used herein, a fluid flow with swirl has an angular orientation relative to the axis of the turbine section that includes both a circumferential component and an axial component. The degree of "swirl" increases when the degree of circumferential flow increases and the degree of axial flow decreases and conversely the degree of "swirl" decreases when the degree of circumferential flow decreases and the degree of axial flow increases. In many instances, flow turning struts are disposed in the core gas path downstream of the turbine section exit to decrease the degree of swirl in the core gas exiting the turbine section. At the exit of these struts, however, a residual amount of swirl typically remains within the core gas flow. Depending on the application and degree of swirl, the swirling air can produce undesirable exhaust losses.

Certain gas turbine engine configurations include an enclosure surrounding the gas turbine engine. This enclosure is in contrast to a bypass duct that surround a gas turbine engine that is configured to produce a bypass flow for thrust purposes. Air disposed within the enclosure is subject to a high temperature environment. In some instances, the enclosure is passively cooled. In other instances, the enclosure is actively cooled with a flow of air passing through the enclosure.

What is needed is a gas turbine engine configuration that can address aerodynamic losses associated with swirling core gas flow, and one that is useful in facilitating active cooling via a purge of enclosure air.

SUMMARY

According to an aspect of the present disclosure, a non-bypass gas turbine engine is provided that includes a compressor section, a combustor section, a turbine section, an engine compartment enclosure, an exhaust nozzle, and a secondary exhaust nozzle. The turbine section has one or more rotors rotatable about an axial centerline. The compressor, combustor, and turbine sections define a core gas path for passage of a core gas flow. The engine compartment enclosure is disposed radially outside of the compressor, combustor, and turbine sections. The engine compartment enclosure defines a first annular region between the engine compartment enclosure and the compressor, combustor, and turbine sections. The exhaust nozzle is disposed downstream of the turbine section and is configured to receive the core gas flow exiting the turbine section. The exhaust nozzle includes a wall panel that extends between a forward end and an aft end of the exhaust nozzle. The wall panel is configured with a plurality of lobes that extend between the forward end and the aft end of the exhaust nozzle. The lobes are distributed around a circumference of the exhaust nozzle.

Each lobe has a lobe height that increases in a direction from the forward end to the aft end of the exhaust nozzle. The secondary exhaust nozzle extends axially aft of the exhaust nozzle. The lobes are configured to de-swirl the core gas flow exiting the turbine section and are configured to draw air from the first annular region during operation of the engine.

In any of the aspects or embodiments described above and herein, the engine may further include a turbine exhaust case disposed between the turbine section and the exhaust nozzle.

In any of the aspects or embodiments described above and herein, the turbine exhaust case may include an outer radial panel, a center body, and a plurality of struts that extend between the center body and the outer radial panel, wherein the center body is disposed radially inside of the outer radial panel and a second annular region is defined by the center body and the outer radial panel, and wherein the second annular region is part of the core gas path.

In any of the aspects or embodiments described above and herein, the plurality of struts may be configured to turn core gas flow passing through the second annular region.

In any of the aspects or embodiments described above and herein, each lobe may include an entry segment disposed adjacent the forward end of the exhaust nozzle, wherein the entry segment is disposed at an entry angle, and each lobe of the plurality of lobes includes an exit segment disposed adjacent the aft end of the exhaust nozzle, wherein the exit segment is disposed at an exit angle, and wherein the exit angle is less than the entry angle.

In any of the aspects or embodiments described above and herein, each lobe may be defined by a first side wall and a second side wall opposite the first side wall, wherein the first side wall intersects the second side wall at a lobe peak.

In any of the aspects or embodiments described above and herein, the entry angle may be disposed between a first line coincident with the lobe peak adjacent the forward end of the exhaust nozzle and the axial centerline.

In any of the aspects or embodiments described above and herein, the entry angle may be in the range of twenty to seventy degrees, and in some embodiments may be in the range of twenty to sixty degrees.

In any of the aspects or embodiments described above and herein, the turbine section may be configured to exit core gas flow at a turbine exit angle of sixty degrees.

In any of the aspects or embodiments described above and herein, the exit angle may be disposed between a second line coincident with the lobe peak adjacent the aft end of the exhaust nozzle and the axial centerline, and the exit angle may be in the range of zero to ten degrees.

According to an aspect of the present disclosure, an aircraft powerplant is provided that includes a nacelle and a gas turbine engine. The nacelle has an engine compartment enclosure. The gas turbine engine includes a compressor section, a combustor section, a turbine section, an exhaust nozzle, and a secondary exhaust nozzle. The turbine section has one or more rotors rotatable about an axial centerline. The compressor, combustor, and turbine sections define a core gas path for passage of a core gas flow. The exhaust nozzle is disposed downstream of the turbine section and configured to receive the core gas flow exiting the turbine section. The exhaust nozzle includes a wall panel that extends between forward and aft ends of the exhaust nozzle. The wall panel is configured with a plurality of lobes that extend between the forward end and the aft end of the exhaust nozzle. The lobes are distributed around a circumference of the exhaust nozzle. Each lobe has a lobe height that increases in a direction from the aft end to the forward end of the exhaust nozzle. The secondary exhaust nozzle extends axially aft of the exhaust nozzle. The engine compartment enclosure is disposed radially outside of the compressor, combustor, and turbine sections. The engine compartment enclosure defines a first annular region between the engine compartment enclosure and the compressor, combustor, and turbine sections. The lobes of the exhaust nozzle are configured to de-swirl the core gas flow exiting the turbine section and configured to draw air from the first annular region during operation of the engine.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
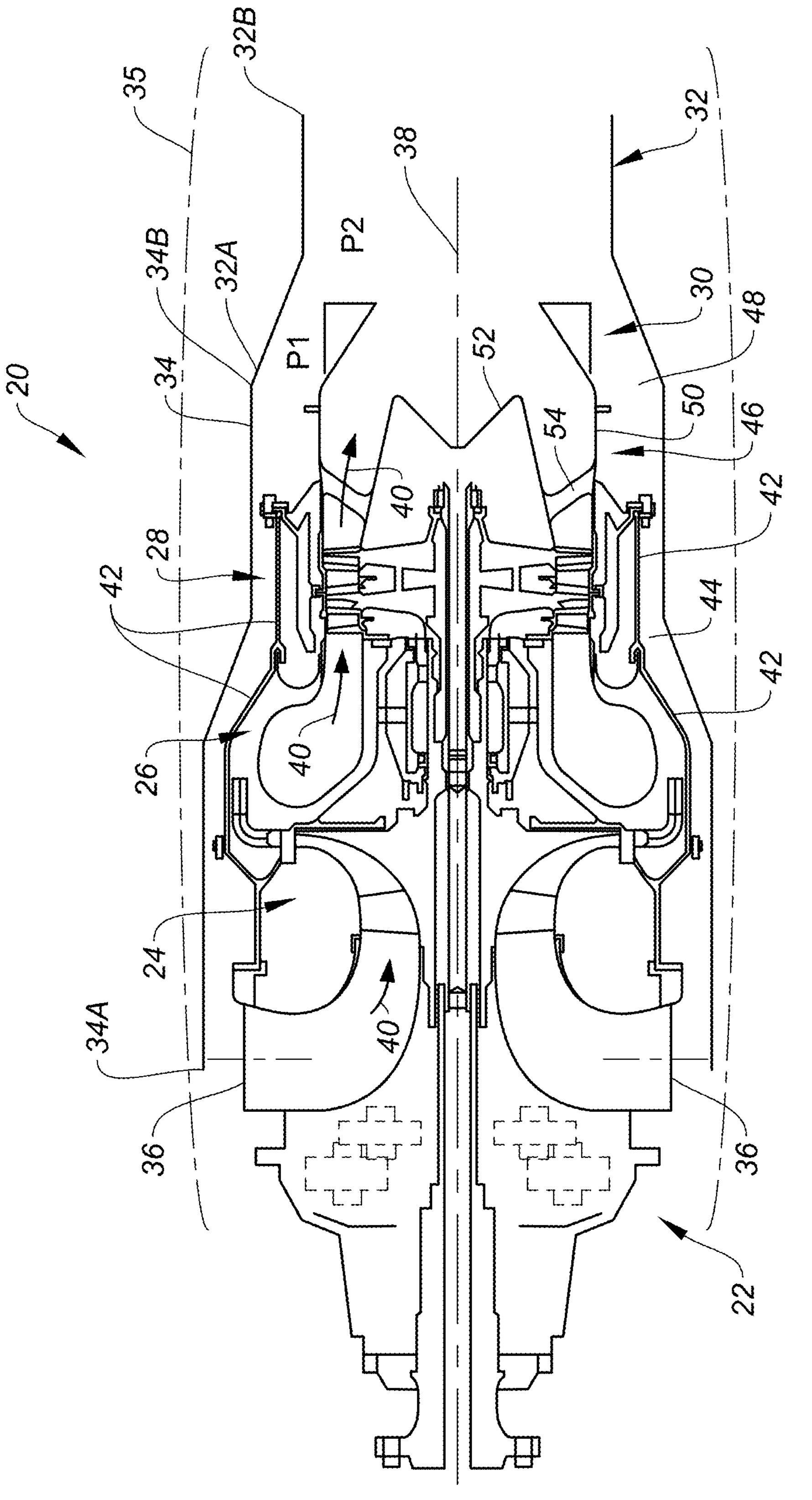
FIG. 1 is a diagrammatic sectional view of a gas turbine engine embodiment.
Figure 3:
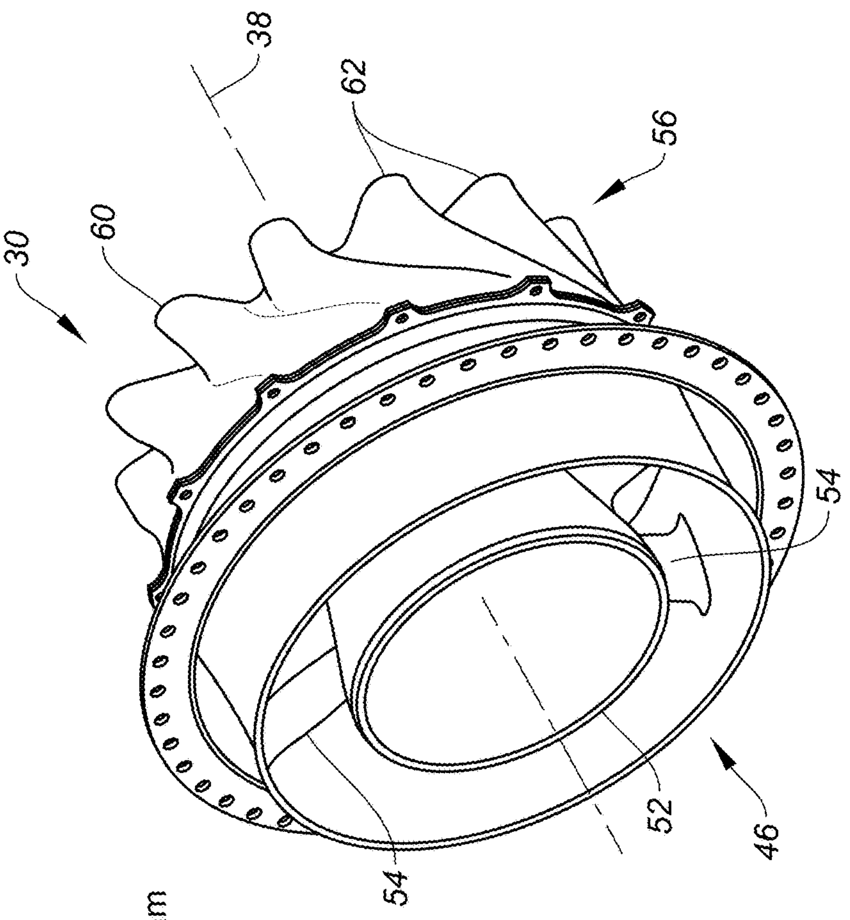
FIG. 3 is a diagrammatic perspective view of a present disclosure exhaust nozzle embodiment.
Figure 2:
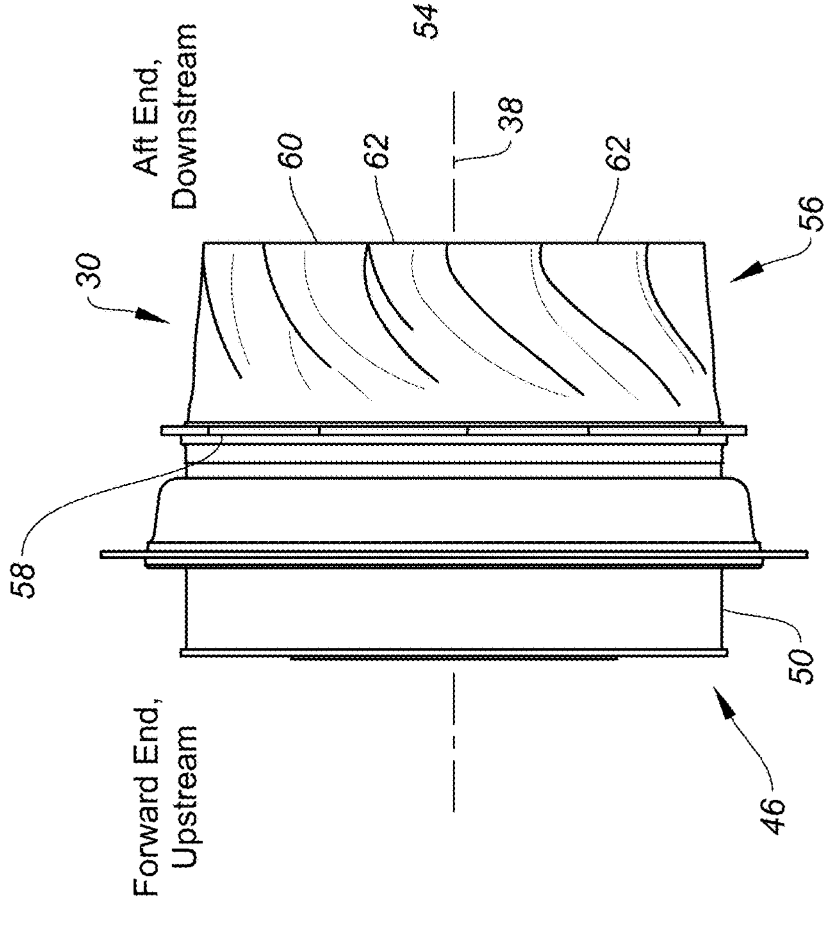
FIG. 2 is a diagrammatic side view of a present disclosure exhaust nozzle embodiment.

FIG. 1 diagrammatically shows a partially sectioned diagrammatic view of a gas turbine engine 20 configured according to aspects of the present disclosure. The gas turbine engine 20 includes a gear box 22, a compressor section 24, a combustor section 26, a turbine section 28, a de-swirling exhaust nozzle 30, and a secondary exhaust nozzle 32. The engine 20 is disposed within an engine compartment enclosure 34. The engine compartment enclosure 34 may be included as a component of the engine 20, or alternatively may be part of a nacelle structure 35 (shown diagrammatically as a dashed line in FIG. 1) as a containing the engine 20. The engine air inlet 36 is disposed adjacent the gear box 22, upstream of the compressor section 24. In this engine embodiment, the gear box 22, the compressor section 24, the combustor section 26, the turbine section 28, the de-swirling exhaust nozzle 30, and the secondary exhaust nozzle 32 are disposed sequentially along an axial centerline 38. The turbine section 28 includes one or more rotors rotatable about the axial centerline 38.

The terms "forward", "leading", "aft, "trailing" are used herein to indicate the relative position of a component or surface. As air passes through the engine, a "leading edge" of a stator vane or rotor blade encounters the air before the "trailing edge" of the same. The compressor section 24 is "forward" of the combustor section 26 and the turbine section 28 is "aft" of the combustor section 26. The terms "inner radial" and "outer radial" refer to relative radial positions from the engine centerline 38. An inner radial component or path is disposed radially closer to the engine centerline 38 than an outer radial component or path. The gas turbine engine 20 diagrammatically shown in FIG. 1 is an example of a non-bypass engine provided to facilitate the description herein. The present disclosure is not limited to this particular non-bypass gas turbine engine configuration.

An engine core gas path 40 extends from the engine air inlet 36, through the compressor, combustor and turbine sections 24, 26, 28, and exits the engine 20 through the de-swirling exhaust nozzle 30 and the secondary exhaust nozzle 32. The engine compartment enclosure 34 has a forward end 34A and an aft end 34B. The engine compartment enclosure 34 is disposed radially outside of the compressor section 24, the combustor section 26, the turbine section 28, and the de-swirling exhaust nozzle 30. The secondary exhaust nozzle 32 has a forward end 32A and an aft end 32B. The aft end 34B of the engine compartment enclosure 34 is engaged with the forward end 32A of the secondary exhaust nozzle 32. In this engine 20 embodiment, structural panels 42 are disposed radially outside of the compressor, combustor, and turbine sections 24, 26, 28. The structural panels 42 are disposed radially inside of the engine compartment enclosure 34, thereby forming an annular region 44 disposed between the structural panels 42 and the engine compartment enclosure 34. The present disclosure is not limited to a configuration wherein the inner radial boundary of the annular region 44 is defined by the structural panels 42 diagrammatically shown in FIG. 1. Air may enter the annular region 44 in a variety of different ways; e.g., through an inlet open to the exterior of the nacelle structure 35, or other static or dynamic inlets. The present disclosure is not limited to any particular path by which air may enter the annular region 44.

In the engine 20 embodiment shown in FIGS. 1-7, a turbine exhaust case 46 is disposed between the turbine section 28 and the de-swirling exhaust nozzle 30, forming a portion of the core gas path 40 between the turbine section 28 and the de-swirling exhaust nozzle 30. In the embodiment diagrammatically shown in FIGS. 1-7, the turbine exhaust case 46 includes an outer radial panel 50, a center body 52, and a plurality of struts 54. The center body 52 is disposed radially inside of the outer radial panel 50 and an annular region is defined therebetween, forming a portion of the core gas path 40. The struts 54 extend between the center body 52 and the outer radial panel 50. The struts 54 may be configured to redirect core gas flow exiting the turbine section 28 (i.e., flow turning struts) in a manner that decreases the degree of swirl in the core gas flow exiting the turbine section 28. The present disclosure does not require flow turning struts 54, however. In some embodiments, the present disclosure may be used without a turbine exhaust case 46.

Figure 4A:
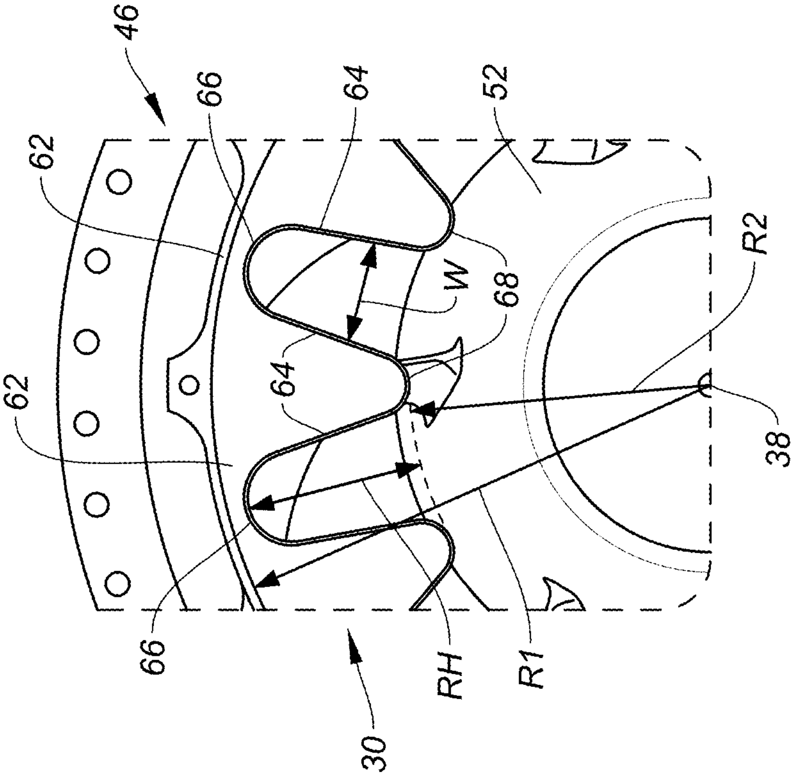
FIG. 4A is an enlarged portion of the view shown in FIG. 4.
Figure 4:
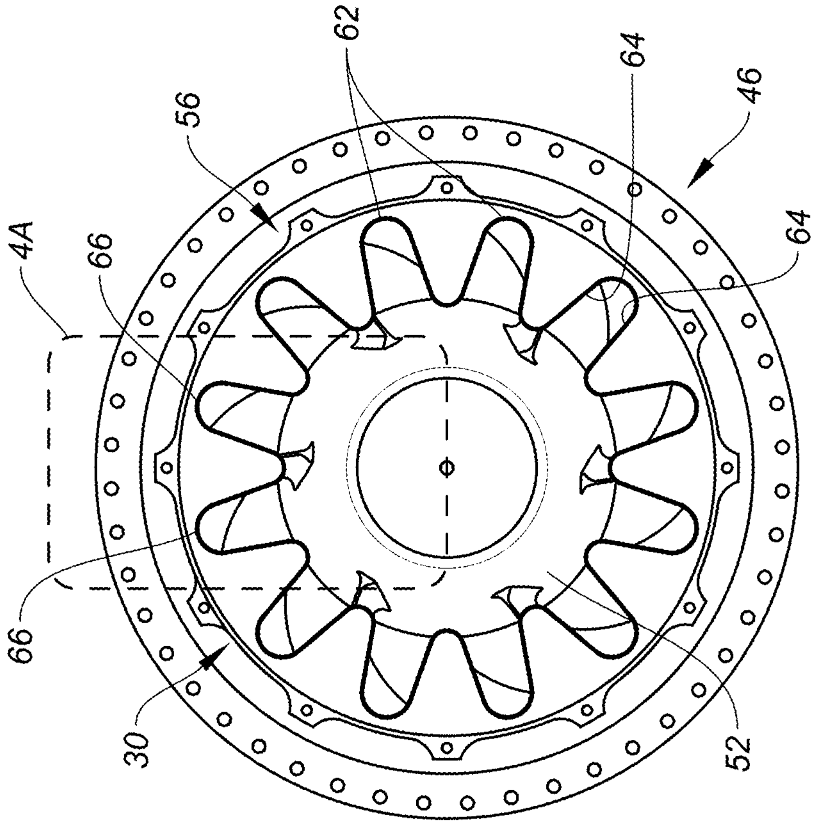
FIG. 4 is a diagrammatic end view of a present disclosure exhaust nozzle embodiment.
Figure 6:
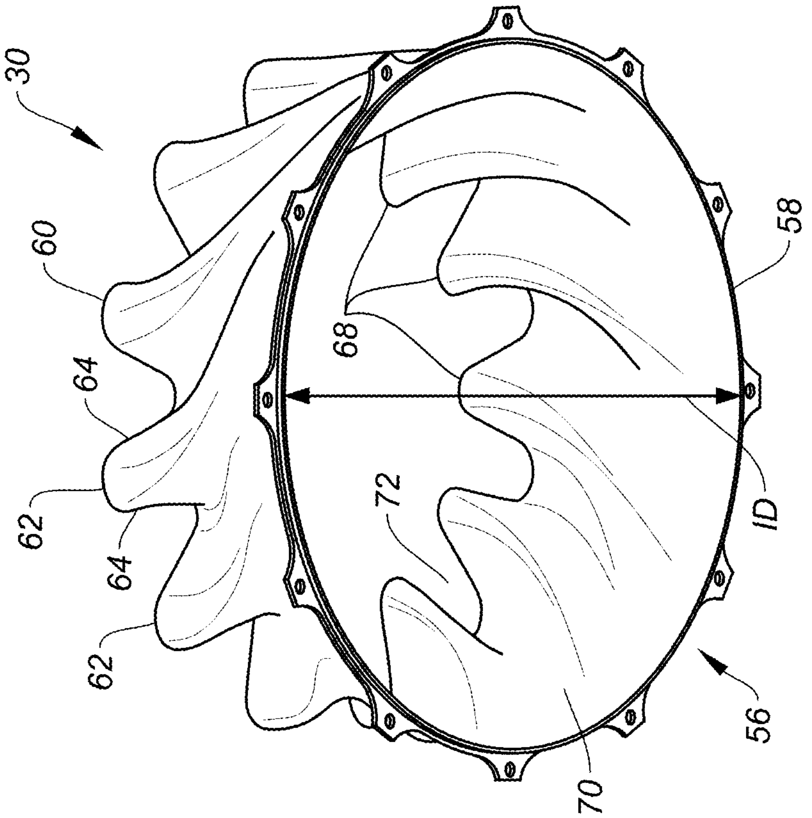
FIG. 6 is a diagrammatic perspective view of a present disclosure exhaust nozzle embodiment.
Figure 5:
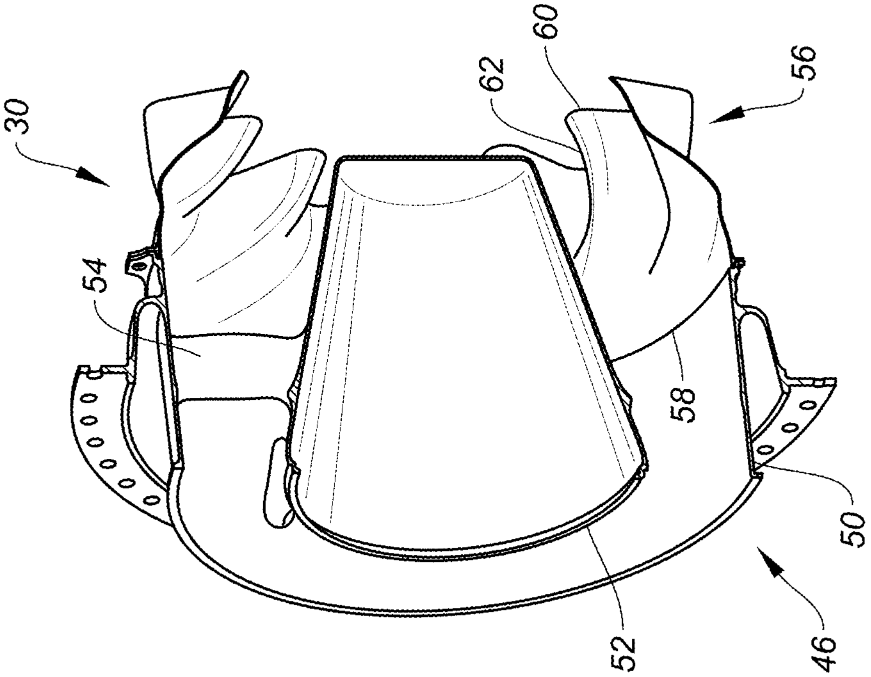
FIG. 5 is a diagrammatic sectional perspective view of a present disclosure exhaust nozzle embodiment.

The de-swirling exhaust nozzle 30 (the "nozzle") includes a wall panel 56 that extends axially between a forward end 58 and an aft end 60. The forward end 58 of the nozzle 30 is attached to the turbine exhaust case 46 (e.g., using mechanical fasteners) and has an inner diameter at the forward end 58. FIG. 6. illustrates the inner diameter ("ID") at the forward end 58 and FIG. 4A shows the forward end radius ("R1"; 2×R1=ID at the forward end of the nozzle 30). The wall panel 56 is configured to form a plurality of lobes 62. Each lobe 62 of the plurality of lobes 62 has the same geometric configuration as the other lobes 62. The nozzle 30 embodiment shown in FIGS. 1-4 includes twelve (12) lobes 62 disposed uniformly around the circumference of the nozzle 30. The present disclosure is not limited to any particular number of lobes 62. Each lobe 62 is defined by opposing side walls 64 that meet at a peak 66. The wall panel 56 is arcuately formed between lobes 62 and may be described as having a radial innermost point 68 (see FIG. 4A) within the arcuate wall panel 56 portion between adjacent lobes 62. The innermost point 68 is disposed at a radius "R2". The radial height ("RH") of a lobe 62 is the difference between R1 and R2. At the forward end 58 of the nozzle 30 embodiments shown in FIGS. 1-7, the radial height of a lobe 62 is zero; i.e., R1=R2, RH=0. The radial height (RH) of a lobe 62 increases in the direction from the nozzle forward end 58 to the aft end 60. The radial height of a lobe 62 is at a maximum at the aft end 60 of the nozzle 30. In some embodiments, the radial height of a lobe 62 may increase uniformly from the nozzle forward end 58 to the aft end 60. In some embodiments, the radial height of a lobe 62 may increase at a non-uniform rate between the nozzle forward end 58 to the aft end 60; e.g., the rate of change of the radial height of a lobe 62 may decrease adjacent the nozzle aft end 60, and the radial height may be constant adjacent the nozzle aft end 60. Other than increasing in radial height between the nozzle forward end 58 and the aft end 60, and the aft end of the lobe 62 being at a maximum radial height, the present disclosure is not limited to any particular radial height rate of change between the lobe forward and aft ends. As a further example, in some embodiments the nozzle 30 may be configured to increase in radius R1 from forward end 58 to aft end 60; e.g., the peaks 66 are disposed at increasing radial distances from the centerline 38 in the direction from forward end 58 to aft end 60.

The distance between the opposing side walls 64 may be referred to as the width ("W") of the lobe 62; see FIG. 4A. Looking at the width of a lobe 62 at a line extending between the adjacent innermost points 68, the width of a lobe 62 may be described as decreasing in the direction from the nozzle forward end 58 to the aft end 60. From that perspective, the width of a lobe 62 is at a maximum at the forward end 58 of the nozzle 30. In some embodiments, the width of a lobe 62 may decrease uniformly from the nozzle forward end 58 to the aft end 60. In some embodiments, the width of a lobe 62 may decrease at a non-uniform rate between the nozzle forward end 58 to the aft end 60. The present disclosure is not limited to any particular width rate of change between the lobe forward and aft ends.

Figure 7:
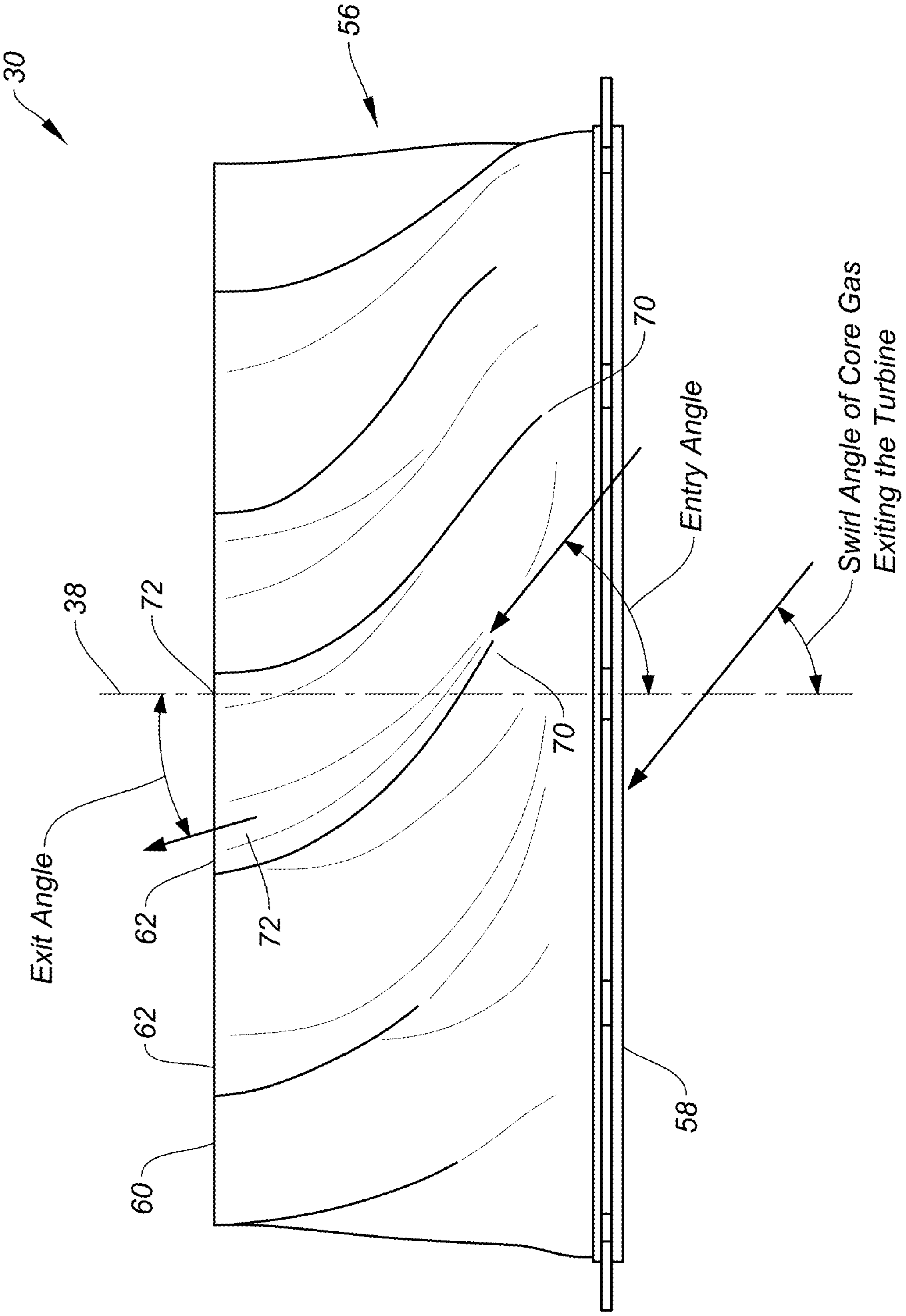
FIG. 7 is a diagrammatic side view of a present disclosure exhaust nozzle embodiment.

Each lobe 62 may be described as having an entry 70 disposed adjacent the forward end 58 of the nozzle 30 and an exit 72 disposed at the aft end of the nozzle 30; e.g., see FIGS. 6 and 7. Each lobe 62 has a swirl angle that is defined as the angle between a line coincident with the peak of the lobe 62 and a line parallel to the axial centerline 38 of the nozzle 30; e.g., see FIG. 7. The swirl angle at the entry 70 of the lobe 62 (shown in FIG. 7 as "ENTRY ANGLE") is greater than the swirl angle at the lobe 62 exit (shown in FIG. 7 as "EXIT ANGLE"). In many present disclosure applications, the entry angle is in the range of about twenty to seventy degrees (20°-70°), and more typically in the range of twenty to sixty degrees (20°-60°) and the exit angle is in the range of about zero to ten degrees (0°-10°). The present disclosure is not limited to these ranges of entry angles and exit angles. In some embodiments, the swirl angle rate of change between the entry 70 and exit 72 of a lobe 62 may be uniform. In some embodiments, the swirl angle rate of change between the entry 70 and exit 72 of a lobe 62 may be non-uniform. Other than the swirl angle decreasing between the entry 70 and exit 72 of a lobe 62, the present disclosure is not limited to any particular swirl angle rate of change between the lobe entry 70 and exit 72. FIG. 7 also diagrammatically illustrates the swirl angle of the core gas flow exiting the turbine section 28, which may be about sixty degrees (60°).

The nozzle 30 may comprise a metallic material that is capable of thermally handling core gas exhausting from the turbine section 28. A non-limiting example of a metallic material that may be used is a nickel alloy such as Inconel. The present disclosure is not limited to any particular material. In some embodiments, the exhaust nozzle 30 may be formed using a metallic material in sheet form. In some embodiments, the exhaust nozzle 30 may be formed using an additive manufacturing process. The present disclosure is not limited to any particular manufacturing process.

Referring to FIG. 1, the present disclosure is configured to decrease the swirl angle of the exhaust gas exiting the turbine section 28 and to produce a pressure gradient (P1>P2; e.g., a "vacuum effect") that draws air from the annular regions 44, 48 disposed between the structural panels 42 and the engine compartment enclosure 34 and between the turbine exhaust case 46 and the engine compartment enclosure 34 and passes that air into the engine secondary exhaust nozzle 32, thereby ventilating those annular regions 44, 48. The pressure gradient is facilitated by the nozzle 30 efficiently de-swirling the core gas flow in a manner that produces relatively low flow losses. A high swirling flow will result in the core gas flow centrifuging out and encountering the secondary exhaust nozzle 32 axially sooner than a non-swirling core gas flow or a reduced-swirling core gas flow. A closer axial point at which the swirling core gas flow encounters the secondary exhaust nozzle 32 will likely effectively reduce the axial length in which mixing can occur between the core gas flow exiting the nozzle 30 and the ventilating air exiting the annular region around the nozzle 30, since the swirling flow can cut off entrainment of the ventilating flow. Therefore, reducing the amount of core gas flow swirl can improve nozzle performance by effectively making a nozzle having a longer aerodynamic axial length.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises"

means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A non-bypass gas turbine engine, comprising:

a compressor section;

a combustor section;

a turbine section having one or more rotors rotatable about an axial centerline;

wherein the compressor section, the combustor section, and the turbine section define a core gas path for passage of a core gas flow;

an engine compartment enclosure disposed radially outside of the compressor section, the combustor section, and the turbine section, wherein the engine compartment enclosure defines a first non-bypass annular region as an air space between the engine compartment enclosure and the compressor section, the combustor section, and the turbine section;

an exhaust nozzle disposed downstream of the turbine section and configured to receive the core gas flow exiting the turbine section, wherein the exhaust nozzle includes a wall panel that extends between a forward end and an aft end of the exhaust nozzle, wherein the wall panel is configured with a plurality of lobes that extend between the forward end and the aft end of the exhaust nozzle, wherein the plurality of lobes are distributed around a circumference of the exhaust nozzle, each lobe has a lobe height that increases in a direction from the forward end to the aft end of the exhaust nozzle, and each lobe has a lobe width that decreases in the direction from the forward end to the aft end of the exhaust nozzle, the lobe width being maximum at the forward end, and the lobe width being measured along a line extending between adjacent radially innermost points of adjacent lobes; and a secondary exhaust nozzle that extends axially aft of the exhaust nozzle;

wherein the plurality of lobes are configured to de-swirl the core gas flow exiting the turbine section and configured to produce a vacuum effect in the secondary exhaust nozzle that ventilates air from the first non-bypass annular region and into the secondary exhaust nozzle with the core gas flow during operation of the engine.

2. The non-bypass gas turbine engine of claim 1, further comprising a turbine exhaust case disposed between the turbine section and the exhaust nozzle.

3. The non-bypass gas turbine engine of claim 2, wherein the turbine exhaust case includes an outer radial panel, a center body, and a plurality of struts that extend between the center body and the outer radial panel, wherein the center body is disposed radially inside of the outer radial panel and a second annular region is defined by the center body and the outer radial panel, and wherein the second annular region is part of the core gas path.

4. The non-bypass gas turbine engine of claim 3, wherein the plurality of struts are configured to turn the core gas flow passing through the second annular region.

5. The non-bypass gas turbine engine of claim 3, wherein each lobe of the plurality of lobes includes an entry segment disposed adjacent the forward end of the exhaust nozzle, wherein the entry segment is disposed at an entry angle, and each lobe of the plurality of lobes includes an exit segment disposed adjacent the aft end of the exhaust nozzle, wherein the exit segment is disposed at an exit angle, and wherein the exit angle is less than the entry angle.

6. The non-bypass gas turbine engine of claim 5, wherein each lobe of the plurality of lobes is defined by a first side wall and a second side wall opposite the first side wall, wherein the first side wall intersects the second side wall at a lobe peak.

7. The non-bypass gas turbine engine of claim 6, wherein the entry angle is disposed between a first line coincident with the lobe peak adjacent the forward end of the exhaust nozzle and the axial centerline.

8. The non-bypass gas turbine engine of claim 7, wherein the entry angle is in the range of twenty to seventy degrees.

9. The non-bypass gas turbine engine of claim 7, wherein the exit angle is disposed between a second line coincident with the lobe peak adjacent the aft end of the exhaust nozzle and the axial centerline.

10. The non-bypass gas turbine engine of claim 9, wherein the exit angle is in the range of zero to ten degrees.

11. The non-bypass gas turbine engine of claim 1, wherein the lobe width decreases at a substantially uniform rate from the forward end to the aft end of the exhaust nozzle.

12. The non-bypass gas turbine engine of claim 1, wherein the lobe width decreases at a substantially non-uniform rate from the forward end to the aft end of the exhaust nozzle.

13. An aircraft powerplant, comprising:

a nacelle having an engine compartment enclosure; and a gas turbine engine, comprising:

a compressor section;

a combustor section;

a turbine section having one or more rotors rotatable about an axial centerline;

wherein the compressor section, the combustor section, and the turbine section define a core gas path for passage of a core gas flow;

an exhaust nozzle disposed downstream of the turbine section and configured to receive the core gas flow exiting the turbine section, wherein the exhaust nozzle includes a wall panel that extends between a forward end and an aft end of the exhaust nozzle, wherein the wall panel is configured with a plurality of lobes that extend between the forward end and the aft end of the exhaust nozzle, wherein the plurality of lobes are distributed around a circumference of the exhaust nozzle, each lobe has a lobe height that increases in a direction from the forward end to the aft end of the exhaust nozzle, and each lobe has a lobe width that decreases in the direction from the forward end to the aft end of the exhaust nozzle, the lobe width being maximum at the forward end, and the lobe width being measured along a line extending between adjacent radially innermost points of adjacent lobes; and a secondary exhaust nozzle that extends axially aft of the exhaust nozzle;

wherein the engine compartment enclosure is disposed radially outside of the compressor section, the combustor section, and the turbine section, wherein the engine compartment enclosure defines a first non-bypass annular region as an air space between the engine compartment enclosure and the compressor section, the combustor section, and the turbine section; and wherein the plurality of lobes of the exhaust nozzle are configured to de-swirl the core gas flow exiting the turbine section and configured to produce a vacuum effect in the secondary exhaust nozzle that ventilates air from the first non-bypass annular region and into the secondary exhaust nozzle with the core gas flow during operation of the engine.

14. The aircraft powerplant of claim 13, further comprising a turbine exhaust case disposed between the turbine section and the exhaust nozzle.

15. The aircraft powerplant of claim 14, wherein the turbine exhaust case includes an outer radial panel, a center body, and a plurality of struts that extend between the center body and the outer radial panel, wherein the center body is disposed radially inside of the outer radial panel and a second annular region is defined by the center body and the outer radial panel, and wherein the second annular region is part of the core gas path.

16. The aircraft powerplant of claim 15, wherein each lobe of the plurality of lobes includes an entry segment disposed adjacent the forward end of the exhaust nozzle, wherein the entry segment is disposed at an entry angle, and each lobe of the plurality of lobes includes an exit segment disposed adjacent the aft end of the exhaust nozzle, wherein the exit segment is disposed at an exit angle, and wherein the exit angle is less than the entry angle.

17. The aircraft powerplant of claim 16, wherein each lobe of the plurality of lobes is defined by a first side wall and a second side wall opposite the first side wall, wherein the first side wall intersects the second side wall at a lobe peak;

wherein the entry angle is disposed between a first line coincident with the lobe peak adjacent the forward end of the exhaust nozzle and the axial centerline.

18. The aircraft powerplant of claim 17, wherein the entry angle is in the range of twenty to seventy degrees.

19. The aircraft powerplant of claim 18, wherein the exit angle is disposed between a second line coincident with the lobe peak adjacent the aft end of the exhaust nozzle and the axial centerline.

20. The aircraft powerplant of claim 13, wherein the lobe width decreases at a substantially uniform rate from the forward end to the aft end of the exhaust nozzle.

* * * * *